United States Patent Office 3,751,491
Patented Aug. 7, 1973

3,751,491
BIS(TRIFLUOROMETHYL)BENZOIC ACIDS
William J. Houlihan, Mountain Lakes, N.J., assignor to Sandoz-Wander, Inc., Hanover, N.J.
No Drawing. Continuation-in-part of application Ser. No. 703,880, Feb. 8, 1968. This application Apr. 10, 1970, Ser. No. 27,459
Int. Cl. C07c 25/14
U.S. Cl. 260—651 F          2 Claims

ABSTRACT OF THE DISCLOSURE

Bis(trifluoromethyl)benzoic acids, e.g., 2,4 - bis(trifluoromethyl)benzoic acid, are prepared by reacting bis-(trifluoromethyl)benzene with alkyl lithium and treating the resulting product with carbon dioxide. The resulting benzoic acids are useful as central nervous system depressants and agrochemical agents.

---

This application is a continuation-in-part of U.S. patent application Ser. No. 703,880, filed Feb. 8, 1968, now abandoned.

This invention relates to fluoromethyl benzoic acids. In particular, it relates to bis(trifluoromethyl)benzoic acids, and processes for the preparation thereof. This invention also relates to intermediates for said compounds and to methods for preparing said intermediates.

The bis(trifluoromethyl)benzoic acids of this invention may be represented by the formula

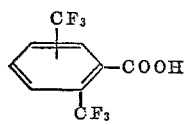

(I)

provided that the trifluoromethyl groups are on other than adjacent carbon atoms of the benzene ring.

More specifically, the preferred compounds of this invention are 2,5-bis(trifluoromethyl)benzoic acid

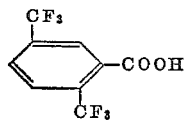

(Ia)

2,4-bis(trifluoromethyl)benzoic acid

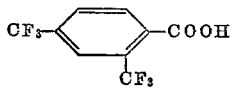

(Ib)

and 2,6-bis(trifluoromethyl)benzoic acid

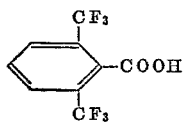

The process for preparing the compounds of Formula I may be represented by the following reaction scheme:

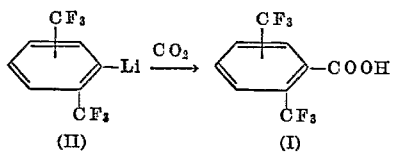

with the proviso as indicated above.

The compounds of Formula I are prepared by treating a corresponding lithium intermediate of Formula II with carbon dioxide in an inert solvent. Although not critical, the reaction is preferably carried out at a temperature of from −50° C. to 35° C. and more preferably at a temperature of −10° C. to 10° C. The carbon dioxide used can be a solid or gas. The preferred inert solvents are lower hydrocarbons such as pentane, hexane, heptane and the like, ethers such as diethyl ether, dibutyl ether and the like, tetrahydrofuran and benzene.

The process for preparing Compound II may be represented by the following reaction scheme:

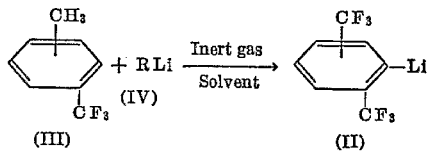

where R represents a straight chain lower alkyl having 1 to 6 carbon atoms.

The intermediate lithium Compound II may be prepared by reacting a bis(trifluoromethyl)benzene (III) with a straight chain lower alkyl lithium Compound IV in a solvent in the presence of an inert gas. The preferred alkyl lithium compound is butyl lithium. The preferred solvents are lower hydrocarbons such as pentane, hexane, heptane, and the like, ethers such as diethyl ether, dibutyl ether, and the like, tetrahydrofuran and benzene. The inert gas may be nitrogen, helium, argon, and the like. Although not critical, the reaction is preferably carried out at a temperature between about −15° C. to 45° C. with the preferred temperature range being −15° C. to 25° C.

When the starting material of Formula III is 1,4-bis-(trifluoromethyl)benzene

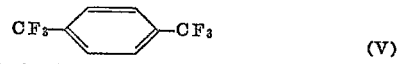

(V)

the intermediate is 2,5-bis(trifluoromethyl)phenyl lithium and has the structural formula

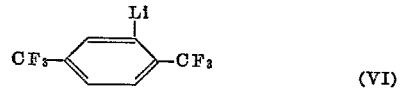

(VI)

When the starting material of Formula III is 1,3-bis(trifluoromethyl)benzene

(VII)

the intermediates are 2,4-bis(trifluoromethyl)phenyl lithium and 2,6-bis(trifluoromethyl)phenyl lithium and can be represented by the structural formula

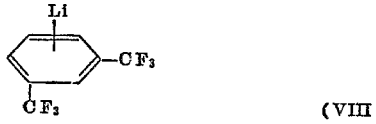

(VIII)

where the lithium is adjacent to at least one of the trifluoromethyl groups.

Using the reaction described above for Compound I, Compounds Ia, Ib, and Ic can be prepared. When 1,4-bis-(trifluoromethyl)benzene (V) is the starting material, the 2,5-bis(trifluoromethyl)benzoic acid (Ia) is obtained. Starting with the 1,3-bis(trifluoromethyl)benzene (VII) a mixture of the 2,4-bis(trifluoromethyl)benzoic acid (Ia) and the 2,6-bis(trifluoromethyl)benzoic acid (Ic) is obtained with the 2,4-bis(trifluoromethyl)benzoic acid predominating. Conventional recovery techniques are utilized for obtaining the products (Ia), (Ib) and (Ic).

Certain of hte compounds of Formula III are known and are prepared by methods disclosed in the literature. Those compounds of Formula III not specifically disclosed are prepared according to analogous methods from known materials.

The bis(trifluoromethyl)benzoic acids represented by Formulas I, Ia, Ib and Ic above are useful because they possess pharmacological properties in animals, such as mammals. In particular, these compounds are useful as CNS depressants as indicated by their activity in mice given a 200 mg./kg. of active agent and tested according to the 30-word adjective check sheet system basically described by Irwin, S. (Gorden Research Conference, Medicinal Chemistry, 1959) and Chen (Symposium on Sedative and Hyponotic Drugs, Williams and Wilkins, 1954).

The bis(trifluoromethyl)benzoic acids may be combined with a pharmaceutically acceptable carrier or adjuvant and may be administered orally or parenterally. The dosage required will vary depending upon the mode of administration utilized and the particular compound employed. However, in general, satisfactory results are obtained when the compounds are administered at a daily dosage of from about 5 milligrams to 200 milligrams per kilogram of animal body weight. This daily dosage is preferably given in divided doses, e.g., 2 to 4 times a day, or in sustained release form. For most large mammals, the total daily dosage is from about 500 to 1000 milligrams, and dosage forms suitable for internal administration comprise from about 125 milligrams to about 500 milligrams of the compound in admixture with a solid or liquid pharmaceutical carrier or diluent.

A representative formulation suitable for oral administration is a tablet prepared by standard tabletting techniques which contains the following:

| Ingredient: | Parts by weight |
|---|---|
| 2,5-bis(trifluoromethyl)benzoic acid | 50 |
| Tragacanth | 2 |
| Lactose | 39.5 |
| Corn starch | 5 |
| Talcum | 3 |
| Magnesium stearate | 0.5 |

The compounds of Formula I are also useful as agrochemical agents, particularly as herbicides and may be used for the destruction or prevention of weeds or unwanted plants.

They may be used as such alone or preferably in combination with an agriculturally or herbicidally acceptable diluent or carrier.

The compounds of the Formula I in thhe form of free acids or as agriculturally or herbicidally acceptable basic addition salts may be worked up to give herbicidal compositions of which the exact nature may vary greatly depending on the intended use. These compositions may be worked up in the usual way, if desired with the addition of adjuvants, to give preparations which may be used in the form of solutions, emulsions, suspensions, pastes, powders, strewing agents, dusting agents and granulates, if desired after further dilution. Liquors for application in the control of plant growth should contain at least 0.02 and preferably up to about 1% of an active agent of this invention. It is also within the scope of the present invention to incorporate into these herbicidal compositions adjuvants which facilitate distribution and increase the adhesion and stability to rain.

Depending on the purpose for which the preparation is to be used, it is possible to add other materials having an influence on plant growth, for example in order to widen the effect spectrum.

Herbicidal preparations containing a compound of this invention may be used in conventional manner, e.g. (a) by emulsification or suspension of the preparation in water and spraying the plants to be treated, for example by sprinkling or spraying a locus to be cultivated or protected before the germination of any weeds, (b) by dusting already existing weeds, or (c) by direct application of a dusting or strewing agent or granulate to the locus to be cultivated. If desired, the preparation may also be worked into the ground, The compounds of Formula I may be applied at a dosage of 2–30 pounds per acre to produce a satisfactory herbicidal effect. An appropriate non-selective dosage is 10–30 pounds per acre whereas a dosage suitable for selective herbicidal action is 2–10 pounds per acre.

EXAMPLE 1

Preparation of 2,5-bis(trifluoromethyl)benzoic acid (Ia)

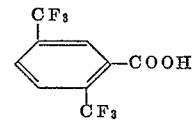

A two neck round bottom flask equipped with a stirrer, dropping funnel and condenser was blanketed with nitrogen and then charged with 100 ml. of anhydrous diethyl ether and 21.4 g. (0.10 mole) of 1,4-bis(trifluoromethyl)benzene. The solution was stirred and treated dropwise (20 minutes) with 75 ml. of 15% n-butyl lithium in hexane (0.12 mole of n-butyl lithium) at room temperature. After stirring an additional 30 minutes at room temperature the reaction mixture was poured onto 200 g. of powdered carbon dioxide. After standing overnight, the resultant semi-solid was treated with 200 ml. of 2 N sodium hydroxide solution. The basic solution was washed with 100 ml. diethyl ether, acidified with concentrated hydrochloric acid and then extracted with 300 ml. of chloroform. The chloroform layer was dried with sodium sulfate, filtered and concentrated in vacuo. The residue was crystallized from pentane to give 2,5-bis(trifluoromethyl)benzoic acid having a M.P. of 71° C.–73° C.

EXAMPLE 2

Preparation of 2,4-bis(trifluoromethyl)benzoic acid (Ib) and 2,6-bis(trifluoromethyl)benzoic acid (Ic)

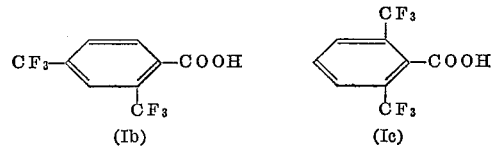

A two neck round bottom flask equipped with a stirrer, dropping funnel and condenser was blanketed with nitrogen and then charged with 100 ml. of anhydrous diethyl ether and 21.4 g. (0.10 mole) of 1,3-bis(trifluoromethyl)benzene. The solution was stirred and treated dropwise (20 minutes) with 75 ml. of 15% n-butyl lithium in hexane (0.12 mole of n-butyl lithium) at room temperature. After stirring an additional 30 minutes at room temperature, the reaction mixture was poured onto 200 g. of powdered carbon dioxide. After standing overnight the resultant semi-solid was treated with 200 ml. of 2 N sodium hydroxide solution. The basic solution was washed with 100 ml. of diethyl ether, acidified with concentrated hydrochloric acid and then extracted with 300 ml. chloroform. The chloroform layer was dried with sodium sulfate, filtered and concentrated in vacuo. The residue was crystallized from pentane to give 14.0 g. of a mixture of 2,6-bis(trifluoro)benzoic acid and 2,4-bis(trifluoromethyl)benzoic acid having a melting point of 76° C.–83° C. The 2,4-bis(trifluoromethyl)benzoic acid predominates.

Treatment of the crude acid with excess diazo methane in diethyl ether gave, after removal of the ether, crude methyl esters. The methyl esters were separated by gas liquid chromatography. The earlier eluting isomer (65%) was refluxed for 6 hours with 2 N potassium hydroxide and then acidified with crude hydrochloric acid. The mixture was extracted with methylene chloride, dried with sodium sulfate, filtered and the solvent removed in vacuo. The residue was crystallized from ether-pentane (1:1)

to give 2,4 bis(trifluoromethyl)benzoic acid (Ib), M.P. 106° C.–108° C.

What is claimed is:
1. A compound of the formula

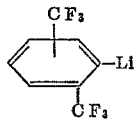

provided that the trifluoromethyl groups are on other than adjacent carbon atoms of the benzene ring.

2. The compound of claim 1 which is 2,5-bis(trifluoromethyl)phenyl lithium.

References Cited
UNITED STATES PATENTS
3,592,842  7/1971  Houlihan _____ 260—651 F OTHER REFERENCES
Benkeser et al., J. Am. Chem. Soc. 73, 1353–1354 (1951).

DANIEL D. HORWITZ, Primary Examiner

U.S. Cl. X.R.
260—515 A; 71—115; 424—317